3,517,431
METHOD OF MAKING COMBINATION FUEL RODS
James E. Ayer, Joliet, Ill., assignor to the United States of America as represented by the United States Atomic Energy Commission
No Drawing. Filed Apr. 28, 1967, Ser. No. 635,961
Int. Cl. B22f 3/24
U.S. Cl. 29—420.5     2 Claims

ABSTRACT OF THE DISCLOSURE

A method of making uniform close-packed dispersions in which different materials are arranged in layers within a container. Predetermined amounts of different materials which are of a relatively large diameter are added to the container in succession and compacted by vibration. Then, in the same order, successive amounts of material which are relatively smaller in diameter are added to the container in quantities just sufficient to occupy the spaces or interstices between the larger diameter materials of the same type, while vibrating the container.

CONTRACTUAL ORIGIN OF THE INVENTION

The invention described herein was made in the course of, or under, a contract with the United States Atomic Energy Commission.

BACKGROUND OF THE INVENTION

This invention relates to a method of making uniform close-packed dispersions of different materials within zones or layers within a container. More specifically it relates to a method for making nuclear fuel rods containing both fuel and blanket material by vibratory compaction in which the fuel and blanket material are situated in separate zones within the fuel rod with a minimum of intermingling between the zones of different material.

Because the day inevitably will come when the world's supply of fissionable uranium is all consumed, there is considerable interest in the development and production of reactors which will produce or breed more fissionable material than they use as a fuel. This type of reactor—known as a breeder reactor—commonly has a blanket of fertile material such as uranium-238 or thorium-232 surrounding a fissionable-fuel-material core. This blanket material absorbs neutrons which are emitted from the fuel and is partially converted into plutonium-239 or uranium-233 which are fissionable. This fissionable material from the blanket can then be processed, concentrated and used as fuel material.

A fuel rod for such a reactor may, for example, consist of a distinct zone containing blanket material, above which in a distinct zone is the fuel material, and above this is the second or upper blanket zone. There should be no intermingling between the materials in each zone.

Advanced nuclear reactor designs can use fuel and blanket material in the form of small spheres which are compacted within the fuel element. By using the vibratory compaction method and apparatus disclosed in U.S. Pat. No. 3,261,378 the density of the fuel elements can be controlled to very close tolerances.

Vibratorily compacted fuel elements are usually formed using several different size components to obtain a fuel element of controlled, high density. The density is dependent upon the amount of void space between particles. Ideally perfect spheres could be used, in which case the space between spheres can be filled with smaller spheres to increase the total density and the space between the smaller spheres can be filled by a still smaller component to increase the density still further. Theoretically, by the use of spherical particles small enough in diameter, close to 100% of density of the spheres can be attained in the fuel rod.

However, it is difficult to make a fuel element containing both core and blanket material in the same fuel element or rod, particularly when the material is particulate or spherical in form, because of the necessity of maintaining a sharp line of demarcation between zones to maintain fixed core and blanket geometry. Also processing requirements for irradiated fuel and blanket material are often different and hence intermingling between the two types of material can in some instances cause reprocessing problems and should be avoided if at all possible.

SUMMARY OF THE INVENTION

It is therefore an object of this invention to provide a method for making a nuclear reactor fuel element containing spherical fuel and blanket material in which the fuel material is contained within a specific predetermined zone.

It is an object of this invention to provide a method for making nuclear reactor fuel elements containing fuel and blanket material in separate zones which can be made on inexpensive and readily obtainable equipment.

It is a further object of this invention to provide a method for making a nuclear reactor fuel element containing spherical fuel and blanket material in which there is little intermingling between the fuel and blanket material.

Finally it is an object of this invention to provide a method for making a nuclear reactor fuel element containing spherical blanket and fuel material in which the total void fraction can be controlled.

In this invention precalculated quantities of different materials which are the same relatively large diameter are added to a container in succession and the container is vibrated to compact the material into layers within the container. After applying a pressure thimble to the material to hold it in place and prevent comingling between layers, successive amounts of smaller diameter material are added to the container in the same order as that material already in the container and compacted by vibrating this smaller diameter material into place. The amount of smaller diameter material which is added is an amount precalculated to just occupy the space remaining in the layer of the same material.

DESCRIPTION OF THE PREFERRED EMBODIMENT

In more detail, the method of the invention consists of precalculating the amount of relatively large diameter material which is to form the first or lowest layer or zone in the container to be packed. This large diameter material is then added to the container while driving the container with a vibrator in order to pack the material into the layer. This same procedure is then followed for each succeeding layer, each time using material of approximately the same relatively large diameter to form each layer within the container while maintaining the vibration.

Once all of the relatively large diameter material is in place within the container, a pressure thimble containing a screen having openings smaller than the large diameter material, but large enough to allow entry of material of a smaller diameter, is placed over the container opening so that it applies pressure to the large material to prevent its movement within the container.

Next a predetermined amount of a smaller selected-size-range of the same material as the first or lowest layer is introduced into the container through the thimble screen while continuing the vibration. Once this smaller diameter material has sifted through the material in the container into the lowest layer and is completely packed therein, relatively smaller diameter material for each succeeding layer may be added to the container in order and vibrated into place to form a dispersion of different materials in sharply defined layers within the container.

The density of the container may be increased by the use of material of a still smaller diameter which would be added in the same manner as just described, as it would act to decrease still further the void fraction of the container.

The vibratory compaction can be carried out using a device similar to that described in the before-mentioned patent. This includes use of a pressure thimble to hold each succeeding component in place and a rattle cage to prevent bridging of the various components. It was found that a simple electromechanical vibrator operating at 60 cycles was able to provide adequate axial vibration to compact the components. Transverse shock or vibration to prevent bridging is imparted to the container by the rattle cage placed over it which bounces back and fourth against the container side because of the axial vibration.

The vibration time was found to be dependent upon the diameters of the spheres being used. It was found that the ratio of sizes determines the rate of entry or rate at which the second component will move through the void spaces between the first component spheres. Thus, the higher the ratio of sizes, the faster the rate of entry and the less vibration time which was required to obtain distinct lines of demarcation at the interface between two layers of different material.

In general, it was found that a vibration time of 10 minutes for each layer of the first component material is sufficient to adequately compact it.

For each layer of second component material about 15 minutes is required to feed the material into the container through the screen; however, vibration is continued for approximately 15 minutes more to ensure complete packing of the component into the layer and to obtain a relatively sharply defined interface with succeeding zones. This is repeated for each component added. Thus it was found that for a fuel element having one fuel layer and two blanket zones of two components each, the total vibration time was a maximum of two hours.

A further advantage in making zoned fuel elements by the method just described is that a large number of rods can be filled and vibrated at the same time on a single piece of equipment.

The amount of first component blanket material necessary is dependent upon the diameter of the fuel rod, the height of the blanket section of the rod and the diameter of the fuel material being used. This can be determined by first finding the packing efficiency, or void packing efficiency, which is the fraction of available void volumes which is occupied by the entering solid material. This may be found by the following equation for the first component:

$$Pe_1 = 0.635 - .216e^{-.0313D/d_1}$$

where $Pe$ is packing efficiency, $D$ is the inside diameter of the tube, $d_1$ the diameter of the spheres within the same tube and $e$ the base of natural logarithms.

Knowing the packing efficiency, the weight of the first component charge may be determined by the following equation:

$$W_{t_1} = V_{d_1} \times G_s \times Pe_1 \times L$$

where $W_t$ is the weight of the spheres, $V_{d_1}$ is the volume of the container per unit length, $G_s$ is the density of the spheres, $Pe_1$ is the packing efficiency and $L$ is the length of the particular fuel or blanket zone being filled.

To find the amount of second component blanket material we must again find the packing efficiency of the second component from the following formula:

$$Pe_2 = 0.635 - 0.735e^{-0.201d_1/d_2}$$

where $d_2$ is the diameter of the second component. This equation will remain the same for all further components since the constant 0.635 in both equations is the limiting density to which spheres will pack into any void, and the value of the multiplier and component is determined by the void shape and the void packing efficiency of all spherical systems will now remain almost constant because the void shape is nearly the same within all spherical matrices.

Once the second component $Pe$ or $Pe_2$ is found, the calculated charge for the second component can be determined by:

$$W_{t_2} = V_{d_2} \times G_s \times Pe_2 \times L$$

where $V_{d_2}$ is determined from $V_{d_1} \times (1 - Pe_1)$.

By use of the preceding equations, and by knowing the fuel density and length of each blanket and fuel zone, the amount of charge for each component can be readily calculated. It will be appreciated that in sequentially filling the zones of the fuel rods according to the method of the present invention, the materials traverse intermediate zones without hang up to create pure moderator and fuel zones. The only intermingling between the moderator and fuel occurs as hereinbefore described at the fuel moderator interfaces and is of an amount such that zone definition is not impaired for the function of the fuel rod.

EXAMPLE I

A binary dispersion was made in a glass tube of cylindrical cross section having an internal diameter of 0.276 inch, using copper shot to simulate blanket material and steel shot to simulate fuel material in order to determine the amount of intermingling. Each blanket zone had a length of 11.8 inches. The largest or $d_1$ spheres had a diameter of 0.086 inch. Solving the equations given below, the calculated first component blanket charge was 56.83 grams. The second component blanket charge had a diameter of 0.015 inch. The calculated charge of this second component material was 18.2 grams.

The fuel zone was 23.01 inches in length with a first component fuel diameter of 0.086 inch and the calculated charge of steel shot was 101.8 grams. The second component fuel zone shot was 0.009 inch in diameter and the required charge was calculated to be 42.0 grams.

The upper blanket zone was of the same length as the lower zone so that the amounts of calculated first and second component needed were the same as for the lower blanket zone.

The rod was packed using the apparatus previously described. The first component blanket material was added to the rod first, followed by the first component fuel material and then first component blanket material again, each material being vibrated for 10 minutes before addition of the next material.

Second component blanket material was added next after replacing the pressure thimble with one having smaller diameter holes to prevent the first component material from shifting. This second component was precalculated using the above equations and added to the fuel rod while continuing to drive it with the vibrator. Once all of the component was added, vibration was continued for 15 minutes to ensure complete compaction. In the same manner, the second component fuel and blanket material, each being vibrated for 15 minutes after addition to the rod, was completed to obtain complete packing.

In this example second component material was added to fill each zone up to the level of the first component material and any excess not used or additional amount needed was used to calculate the deviation of the total charge from the calculated charge. As shown in Table I, the deviation amounted to no more than 2.5% of the total charge for each zone. The calculated density was 73.5% for the upper and lower blanket sections and 79% in the fuel section. There was a little intermingling between zones of about ¼ inch or less at each interface or about 0.7%, since only the second component could intermingle between zones.

TABLE I

|  | First component charge (g.) | | Second component charge (g.) | | Deviation of total charge from calculated, percent |
| --- | --- | --- | --- | --- | --- |
|  | Calculated | Actual | Calculated | Actual |  |
| Upper axial blanket | 56.8 | 56.9 | 18.2 | 19.9 | 2.4 |
| Fuel | 101.8 | 101.8 | 42.0 | 41.7 | 0.2 |
| Lower axial blanket | 56.8 | 56.9 | 18.2 | 19.9 | 2.4 |

EXAMPLE II

The fuel tube and shot diameters are the same as given in the previous example. The blanket length was 10.89 inches for both upper and lower blanket zones with a 21.78 inch fuel zone section. The tube was loaded in the same manner as the tube in the previous example. The results and differences between the calculated and actual material used are given in Table II.

TABLE II

|  | First component charge (g.) | | Second component charge (g.) | | Deviation of total charge from calculated percent |
| --- | --- | --- | --- | --- | --- |
|  | Calculated | Actual | Calculated | actual |  |
| Upper axial blanket | 51.0 | 53.3 | 16.3 | 18.3 | [1] 6.2 |
| Fuel | 91.3 | 92.4 | 38.4 | 38.0 | 0.5 |
| Lower axial blanket | 51.0 | 51.6 | 16.3 | 17.7 | 3.0 |

[1] These calculations are based upon loading a fuel rod to a precise height rather than an average. If the upper axial blanket was restricted to 51.0 g. (about ½ in. difference in height over about four feet of rod) in Tube No. 3, the deviation of total charge from the calculated value would be 1.8% instead of 6.2%.

It is to be understood that the invention is not to be limited to the details given herein but that it may be modified within the scope of the appended claims.

The embodiments of the invention in which an exclusive property or privelege is claimed are defined as follows:

1. A method of preparing a fuel element for a nuclear reactor comprising: introducing a predetermined amount of blanket material of predetermined size into a tube, vibratorily compacting said blanket material, introducing a predetermined amount of fuel material of the same predeterimned size range into said tube, vibratorily compacting the fuel material, introducing a predetermined amount of blanket material of a pretermined smaller size range into said tube, vibratorily compacting said blanket material, restraining said materials from axial movement in the tube, introducing a predetermined amount of blanket material of a predetermined smaller size into said tube, said material being small enough to penetrate the interstices within the larger material and said predetermined amount being of sufficient quantity to just occupy said interstices within said first blanket material, subjecting said tube to axial and transverse vibration, and sequentially repeating the procedure with predetermined amounts of fuel material and blanket material of said same smaller size.

2. The method of claim 1 wherein predetermined amounts of still-smaller-diameter material are sequentially added to said rod in the same orders as said larger material present in said rod, said material being small enough to penetrate the interstices within the larger material and said predetermined amount being of sufficient quantity to just occupy the interstices of the same material, and vibratorily compacting said still-smaller-diameter material.

References Cited

UNITED STATES PATENTS 3,122,595   2/1964   Oxley _____ 264—.5
3,261,378   7/1966   Ayer et al. _____ 264—70

JOHN F. CAMPBELL, Primary Examiner

R. J. CRAIG, Assistant Examiner

U.S. Cl. X.R.

29—420; 176—68; 264—.5

UNITED STATES PATENT OFFICE
CERTIFICATE OF CORRECTION

Patent No. 3,517,431   Dated June 30, 1970

Inventor(s) James E. Ayer

It is certified that error appears in the above-identified patent and that said Letters Patent are hereby corrected as shown below:

Column 5, line 48, "a" should read --the same--; "smaller" should be deleted.

SIGNED AND SEALED
NOV 17 1970

(SEAL)
Attest:

Edward M. Fletcher, Jr.
Attesting Officer

WILLIAM E. SCHUYLER, JR.
Commissioner of Patents